ALL RESISTORS RATED 0.5W
UNLESS OTHERWISE NOTED

United States Patent Office 3,487,279
Patented Dec. 30, 1969

3,487,279
DUAL CONVERTER ELECTRICAL DRIVE SYSTEM
Loren F. Stringer, Williamsville, and Emil T. Schonholzer, Depew, N.Y., assignors to Westinghouse Electric Corporation, Pittsburgh, Pa., a corporation of Pennsylvania
Filed Feb. 13, 1967, Ser. No. 615,804
Int. Cl. H02p 1/22, 1/40
U.S. Cl. 318—257          4 Claims

ABSTRACT OF THE DISCLOSURE

An electrical drive is disclosed which may be operated in forward or reversed directions and which is supplied from a power unit having forward thyristors for supplying current in the forward direction and reverse thyristors for supplying current in the reverse direction and a common gate pulse generator which is selectively set by a relay to fire the forward or reverse thyristors depending on the direction of operation desired. The drive is regulated from a plurality of regulating loops including a voltage loop having a voltage controller and a current loop. The selection of the setting of the gate pulse generator is effected by a signal from the voltage controller which operates through a reversing logic network to control the relay and the polarity of the feedback signal in the current loop.

---

This invention relates to the art of electrical drive systems and has particular relationship to drives which are energized through converters including valves such as ignitrons or thyristors. Specifically, this invention concerns itself with bi-directional drives which are energized from Dual Converters. Such Dual Converters include valve means for energizing the drive to operate in a forward direction and additional valve means for energizing the drive to operate in the reverse direction. Such drives are used for energizing reversing loads typically in continuous welding of pipe or the like in which the welding apparatus carries out a welding traverse and is then reset. Another typical use of such drives is in rolling mills where the rolls are operated both in forward and in reverse directions.

Such an electical drive typically includes a motor which is rotated in a forward or reverse direction to effect the driving in either of these directions and which has a rating of 75 or 100 horsepower or more. When the motor is to rotate in the forward direction it is supplied through the forward valve means of the Dual Converter and when it is to operate in the reverse direction it is supplied through the reverse valve means of the Dual Converter. The speed of the motor is regulated. The control and regulation of the motor may be effected in different ways. The armature current may be controlled, the field current may be controlled, or the armature or field current of a generator which supplies the motor through the converter may be controlled. The Dual Converter may be symmetric or asymmetric. In a symmetric Dual Converter, the forward and reverse valve means have the same ratings so that the same power is conducted in each direction. In an asymmetric converter the forward and reverse valve means are rated differently so that more power is conducted in one direction than in the other direction.

The speed of the motor is controlled and regulated by feedback loops which are connected to control the power which the valve means supply to the motor when in power supply relationship with the motor by controlling the conduction of the valve means. In the typical practice of this invention there are three such loops: an outermost speed loop which regulates in response to feedback from the motor supplied through a tachometer generator or other motor-speed responsive device; an intermediate current loop which regulates responsive to the feedback supplied through current transformers which transmit a signal proportional to the current supplied to the motor; and an innermost voltage loop, which regulates responsive to feedback dependent on the voltage directly controlling the motor; for example, the net armature voltage of the motor. Where the feedback voltage is the armature voltage, the feedback in inner loop is proportional or equal to the difference between the voltage impressed from the converter and the counter-electromotive force of the motor. To assure stability, it is necessary that the time response to an error signal of the outer speed loop shall be substantially higher than the time response of the intermediate current loop and the time response to an error signal of the intermediate loop shall be substantially higher than the time response of the voltage or inner loop.

The speed loop includes a Speed Controller, the Current loop includes a Voltage Controller. The Speed Controller drives its reference signal from a master reference which is set by an operator or computer or the like; the Current Controller derives its reference signal and the Speed Controller and the Voltage Controller derives its reference signal from the Current Controller. The Gate Pulse Generator derives the compensating or regulating command from the Voltage Controller.

The control of the power supplied through the Dual Converter is effected by a Gate Pulse Generator which is connected in controlling relationship with the valve means of the Dual Converter. In accordance with prior art practice, a common Gate Pulse Generator controls both the forward valve means and the reverse valve means. This common Gate Pulse Generator is selectively connected to the Dual Converter so that it is in controlling relationship with the appropriate valve means depending on the demands of the load on the motor. To effect this selective connection automatically, the Gate Pulse Generator is in accordance with the teachings of the prior art controlled from the Current Controller of the current loop.

This prior art apparatus has on the whole operated satisfactorily but it has required excessively complex apparatus for controlling the selection of the Gate Pulse Generator and in some installations, particularly where the control of the motor is effected through its field, has failed to operate with entire reliability.

It is an object of this invention to overcome the deficiencies and disadvantages of the prior-art apparatus and to provide drive apparatus including a Dual Converter controlled from a common Gate Pulse Generator which shall not be as complex as the prior art apparatus and shall operate reliably in the setting of the Gate Pulse Generator to select the appropriate valve means of the Dual Converter.

This invention arises from the realization that the complexity of the prior-art control is caused by the necessity of providing a logic network for evaluating a number of factors in determining the setting of the Gate Pulse Generator responsive to a signal from the Current Controller. Typically, the primary power for the motor is supplied from a polyphase supply and the current signal is derived through current transformers from the buses of the supply. Complex logic networks are required to determine from the magnitude and polarity of this current signal what command signal should be transmitted to the Gate Pulse Generator. It has also been realized that the reliability of the prior-art apparatus is adversely affected by the difficulty of determining at what point the current signal is at zero magnitude. This difficulty is encountered more in drives in which the motor is regulated and controlled through its field than in drives in which the regulation and control is effected through the armature. In armature control the ripple in the current flow may serve at least to a limited extent as a criterion for determining when the current through the armature is at a low magnitude. But in the case of field control, the ripple is not present or is of such low magnitude as not to be usable to serve as a criterion.

In accordance with this invention the output voltage of the Voltage Controller serves to control the selection function Gate Pulse Generator. This output voltage requires far simpler logic circuitry than the signal from the Current Controller. In addition the decrease of the output voltage of the Voltage Controller to zero magnitude is readily detected and the difficulties in detecting zero current of the feedback-current signal are not encountered. Further simplification may be effected, in accordance with this invention, by limiting the Dual Converter so that it does not saturate. This is achieved by limiting the reference signal to the Voltage Controller so that it does not exceed a predetermined magnitude. With such limitation imposed on the Voltage Controller reference signal, the setting of the Gate Pulse Generator is determined by the polarity of the output voltage of the Voltage Controller.

Apparatus according to this invention is characterized by the following principal functional components.

(a) THE GATE PULSE GENERATOR

The function of this component is to produce gate pulses to control the valves of the Dual Converter. Typically, these valves are thyristors connected in a six-phase doubleway (three-phase bridge) circuit. These pulses are phase adjustable by means of a DC input voltage signal. The Gate Pulse Generator consists of a power supply and synchronization panel, a phase shifter panel, a gate control transformer, and a cosine transformer. The Gate Pulse Generator is used to gate either the forward or the reverse channel in the Dual Converter. The selection is made through a relay, which typically is a mercury wetted relay, and which is actuated by the Reversing Sensor. The Gate Pulse Generator also includes means for instantaneous gate pulse suppression in case of a fault current in the Dual Converter, as well as such suppression for sequencing purposes.

(b) THE VOLTAGE SENSOR

This component consists of an amplifier panel and a function board. Its function is to transduce the bus (armature, field) voltage into an isolated DC signal of suitable amplitude for the regulating functions.

(c) THE VOLTAGE CONTROLLER

This component consists of an amplifier panel and an associated function board accommodating input and feedback resistors, the balancing potentiometer and components required to reverse the output voltage polarity. Its inputs are fed from the Voltage Sensor and from an external reference source of opposite polarity. These two signals are matched against each other, producing an error voltage which in turn is amplified and fed to the Gate Pulse Generator. Thus a negative voltage feedback loop is closed.

(d) REVERSING AND CURRENT SENSOR

These two components perform electrically separate functions.

(i) The Reversing Sensor is a high gain switching amplifier. It is used to sense the output-voltage polarity of the Voltage Controller which is an indication of the polarity of the load current required. It actuates Reversing relays in the Voltage Controller, the Gate Pulse Generator and the Current Sensor.

(ii) The Current Sensor is used to reconstruct, with the help of 3 externally mounted current transformers which measure the AC current to the Dual Converter, a DC analog signal proportional to the load current. This signal is also used to supply the heater of an overload relay, and to actuate a one-shot pulse circuit for gate pulse suppression purposes. The polarity of the analog signal can be reversed by a relay. The state of this signal depends on the polarity of the load current. It is actuated by the Reversing Sensor.

For a better understanding of this invention, both as to its organization and as to its method of operation, together with additional objects and advantages thereof, reference is made to the following description taken in connection with the accompanying drawings, in which.

Figure 3:
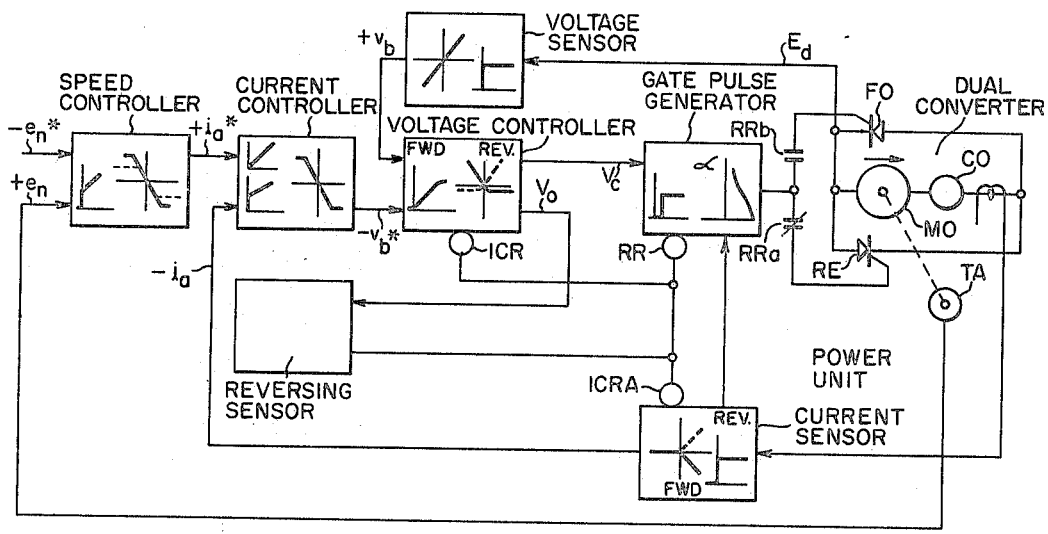
FIG. 3 is a block diagram showing the principal components included in a typical such amplified embodiment of this invention.
Figure 5A:
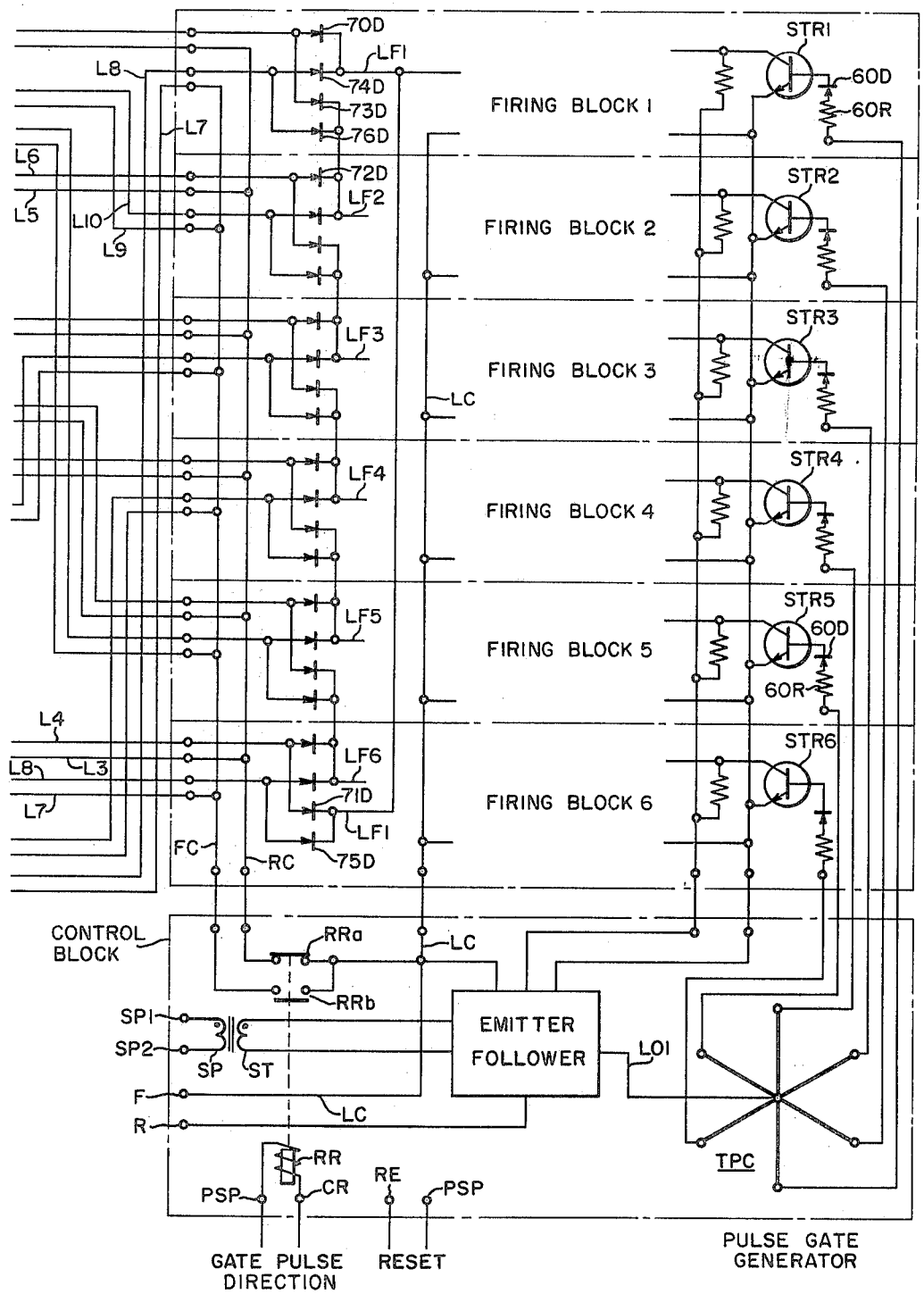
Figure 5B:
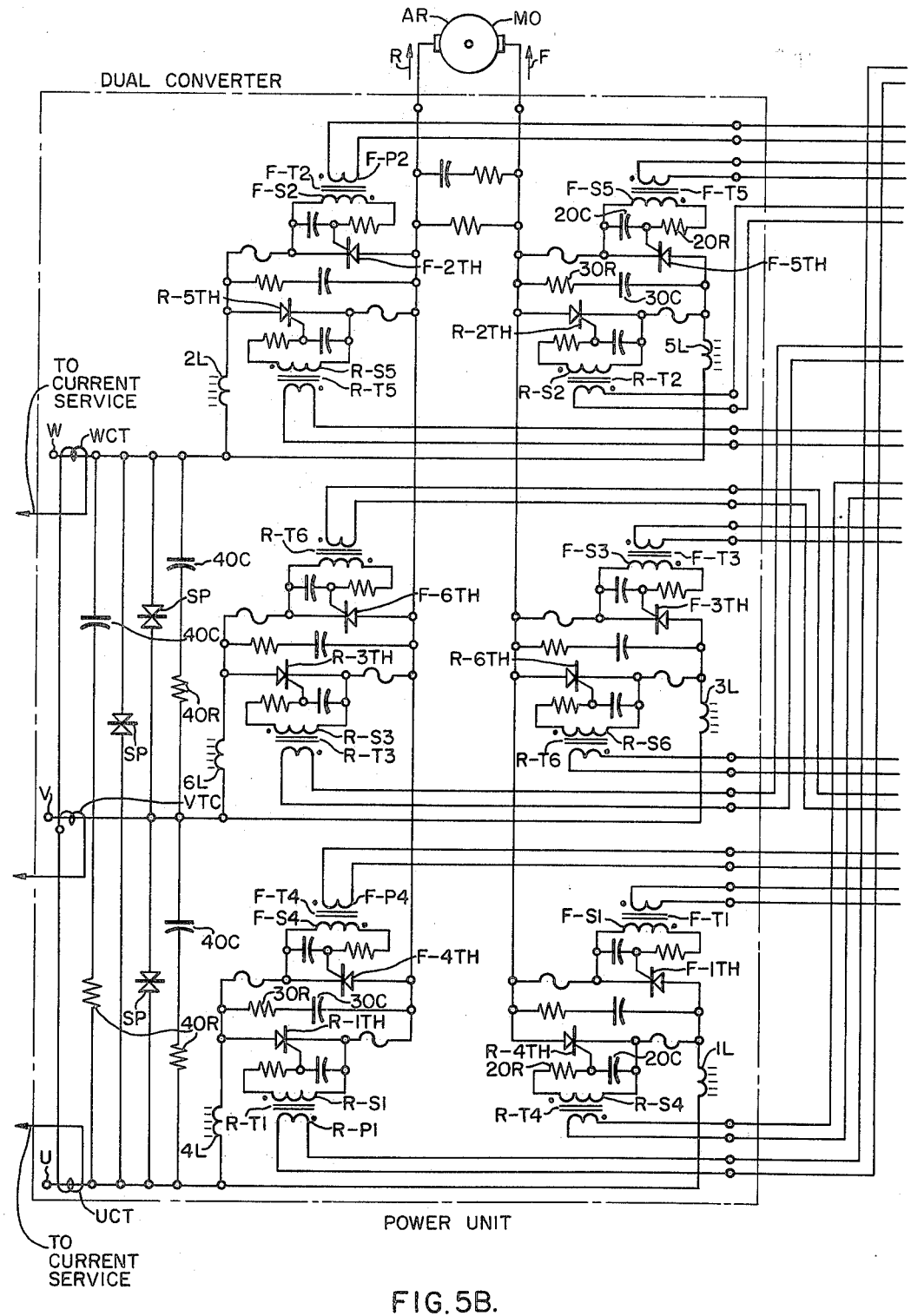
Figure 6:
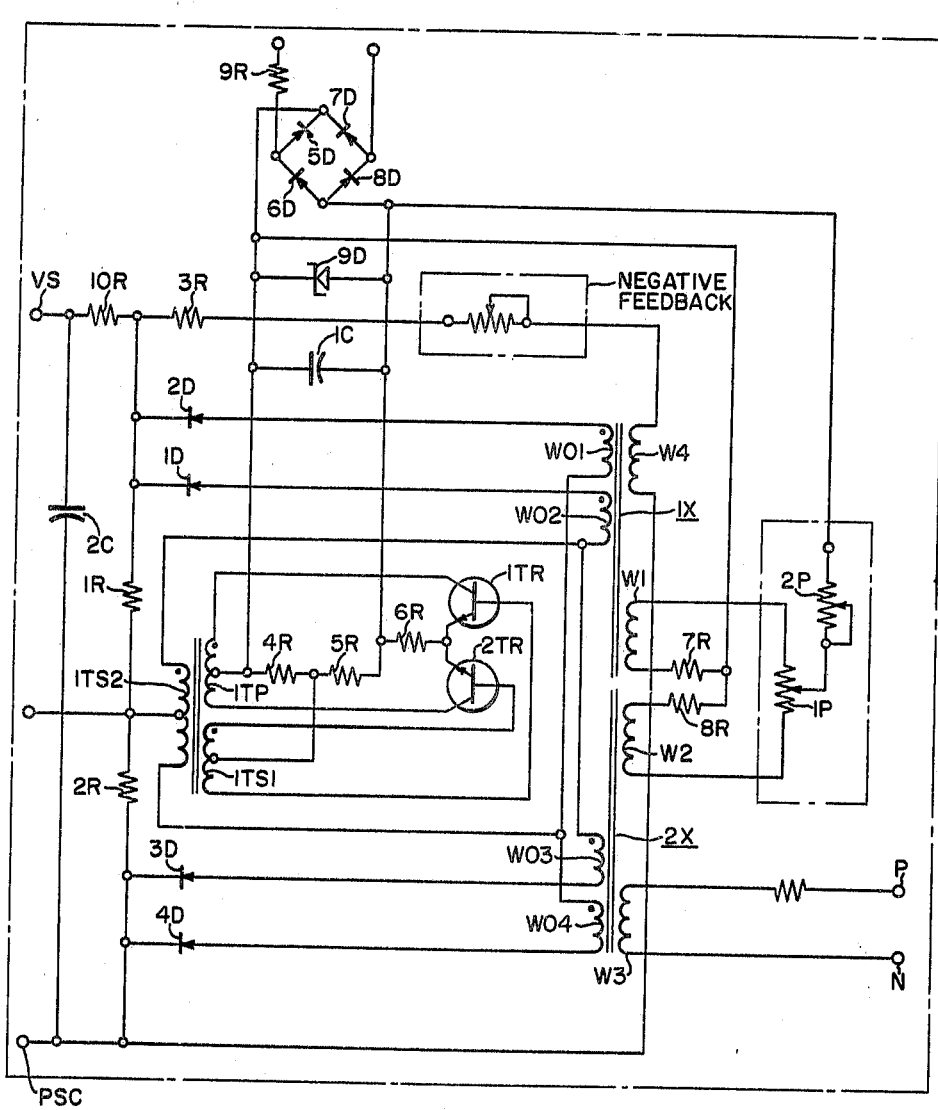
Figure 6A:
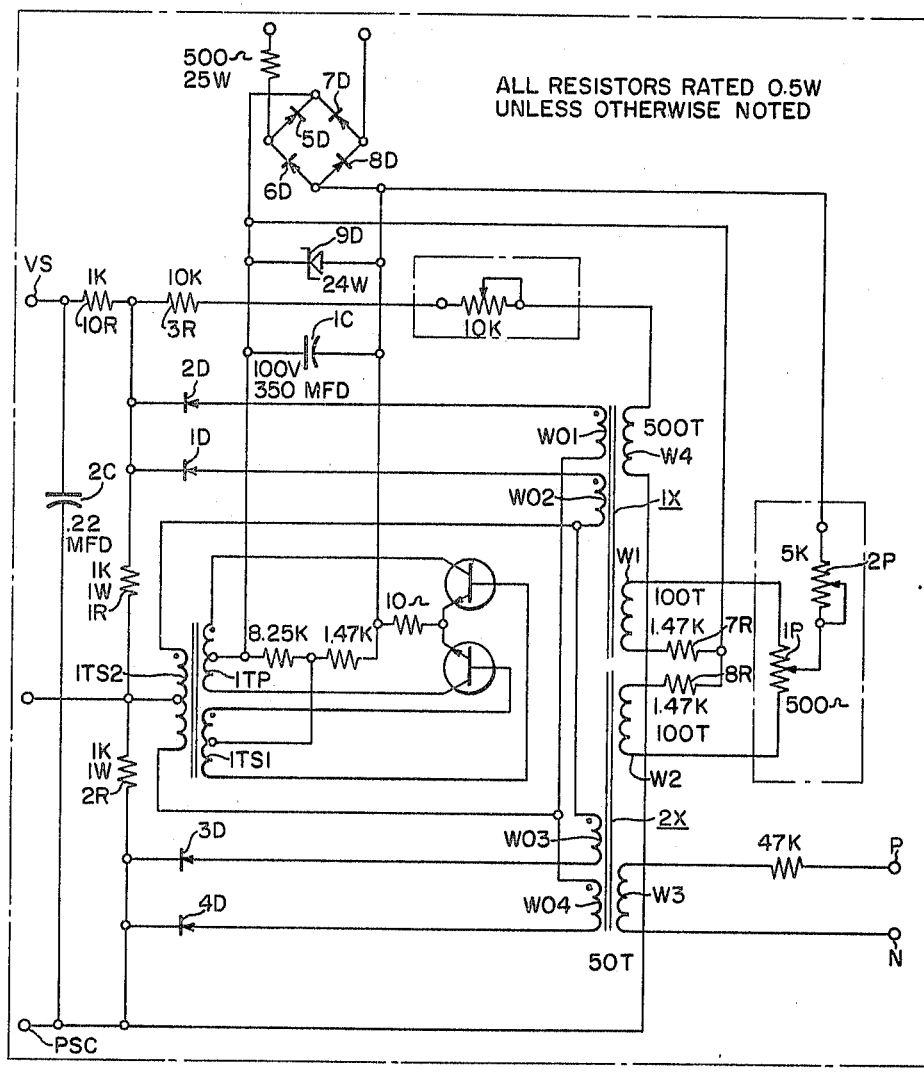
Figure 7:
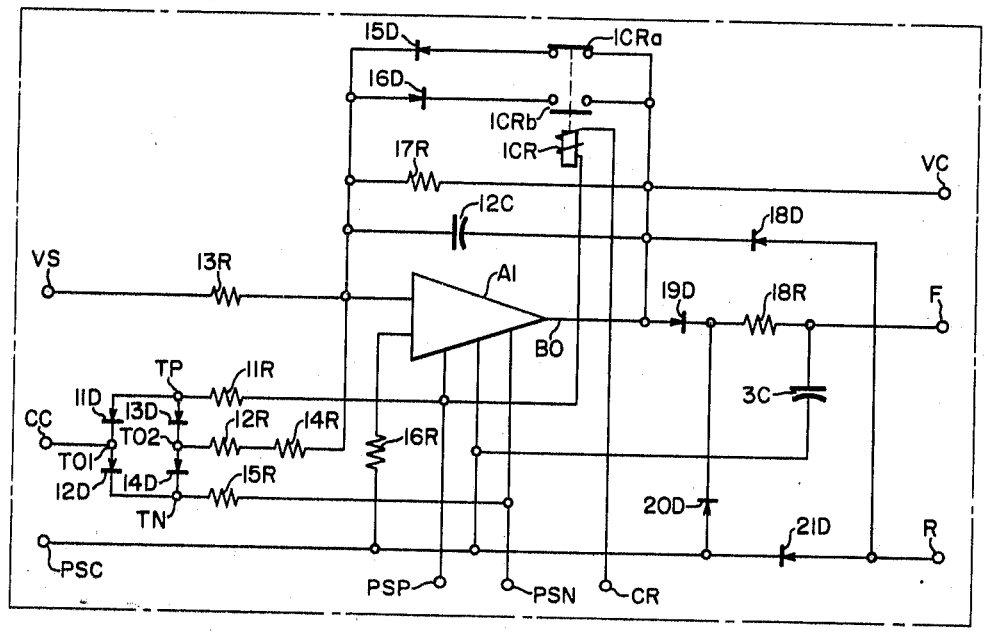
Figure 8:
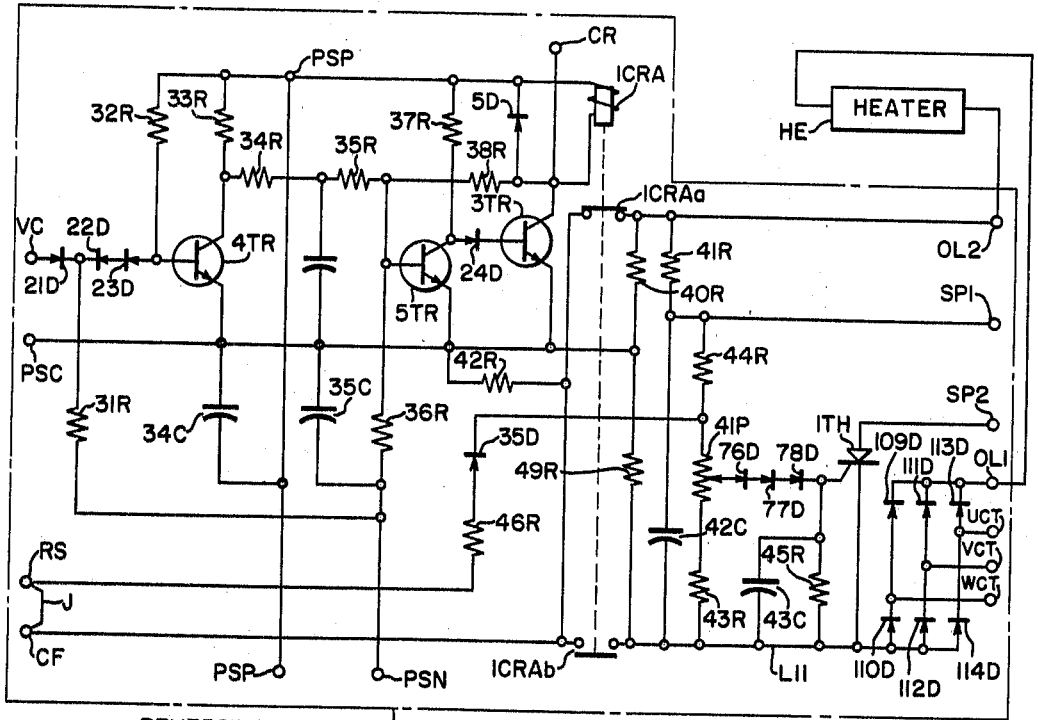
Figure 7A:
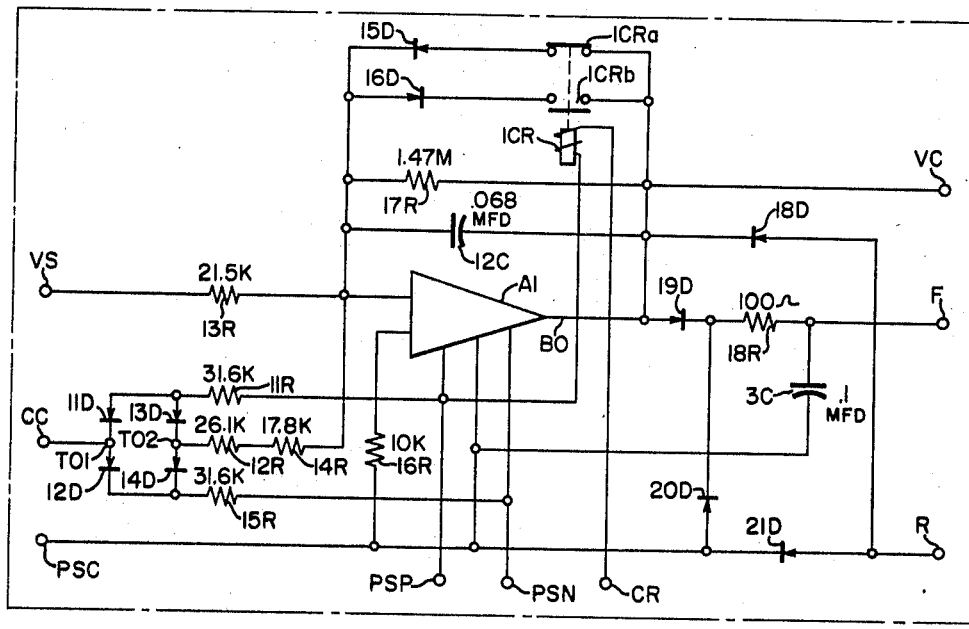
Figure 8A:
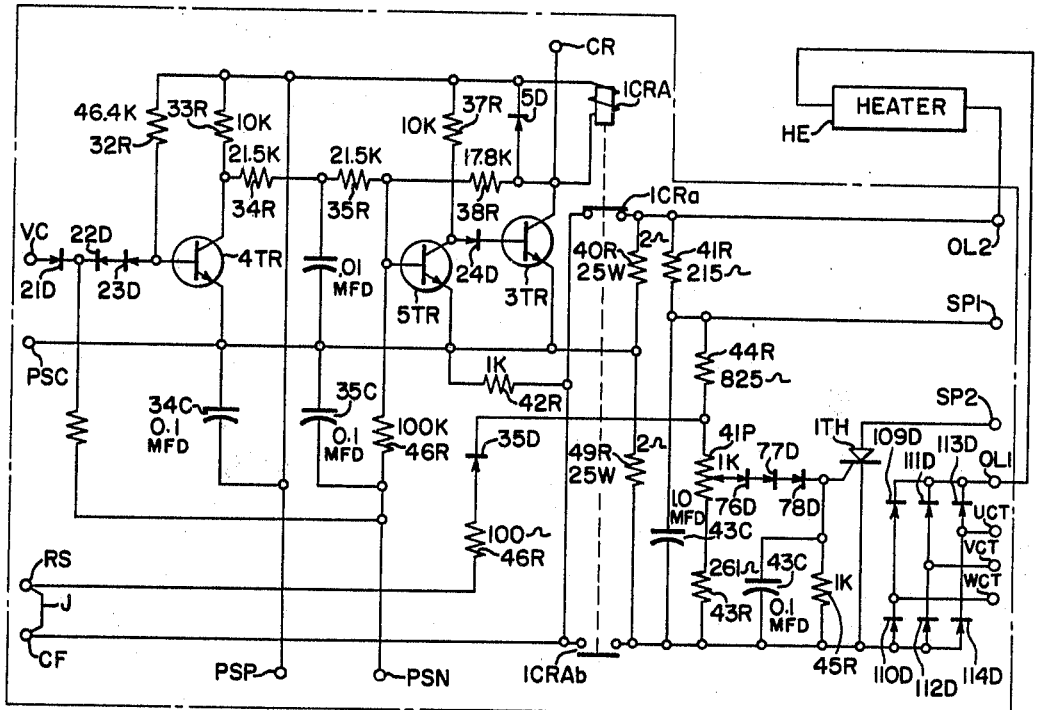

FIGS. 5A and 5B together constitute a diagram partly in block form and partly schematic showing the Power Unit (FIG. 5B) and the Gate Pulse Generator (FIG. 5A) included in apparatus in accordance with this invention;

FIG. 6 is a schematic showing the Voltage Sensor of the apparatus shown in FIG. 3;

FIG. 6A is a schematic similar to FIG. 6 but showing the magnitude of the principal components of a Voltage Sensor apparatus as disclosed in FIG. 3 which has operated satisfactorily;

FIG. 7 is a schematic showing a Voltage Controller included in the apparatus in accordance with this invention;

FIG. 7A is a schematic similar to FIG. 7 but showing the magnitudes of the principal components of a Voltage Controller apparatus as disclosed in FIG. 3 which operated satisfactorily;

FIG. 8 is a schematic showing the Reversing Sensor and Current Sensor included in apparatus as shown in FIG. 3;

FIG. 8A is a schematic similar to FIG. 8 but showing the magnitudes of the principal components of a Reversing Sensor and Current Sensor of apparatus as disclosed in FIG. 3 which operated satisfactorily.

Figure 2:
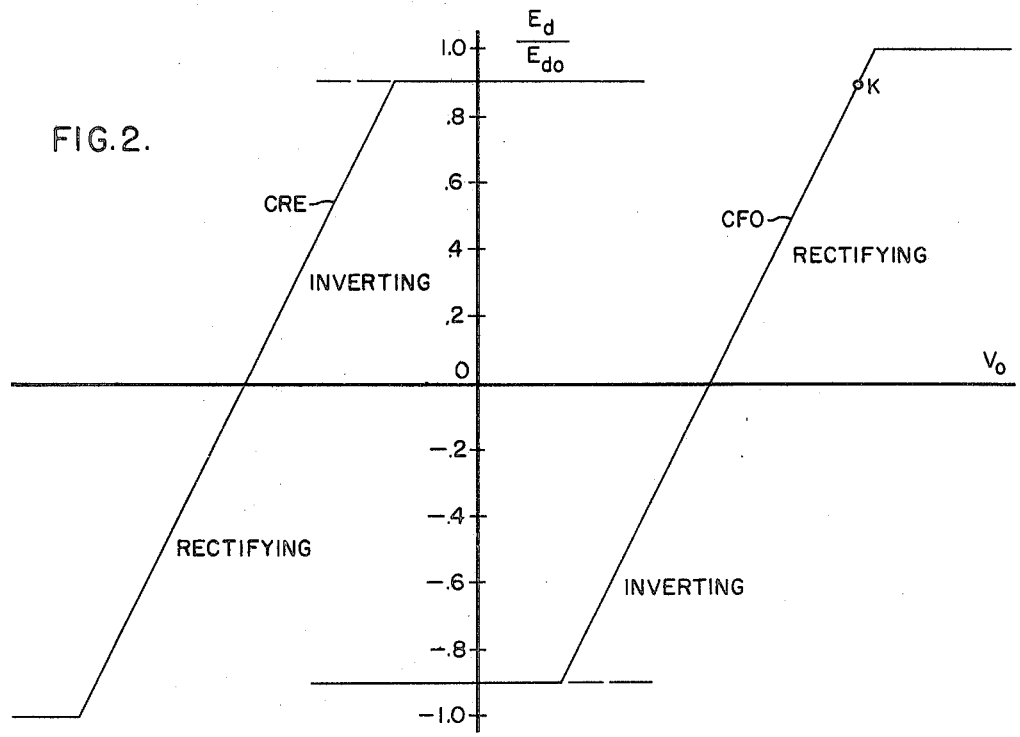
FIG. 2 is a graph illustrating the operation of the embodiment shown in FIG. 1.
Figure 9:
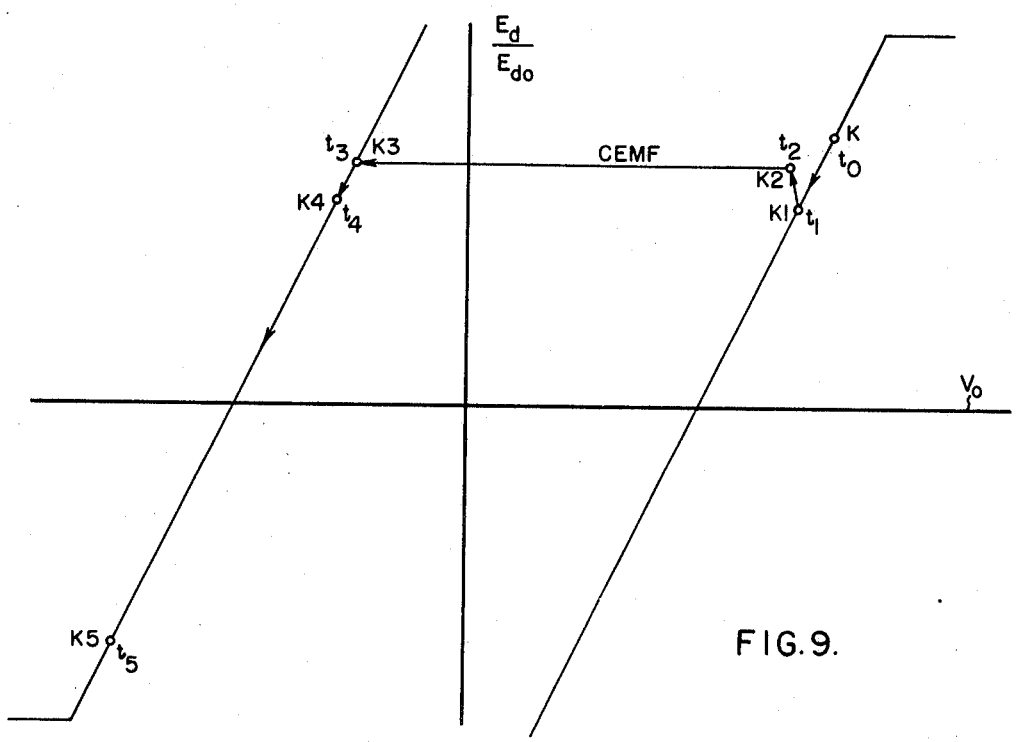
Figure 10A:
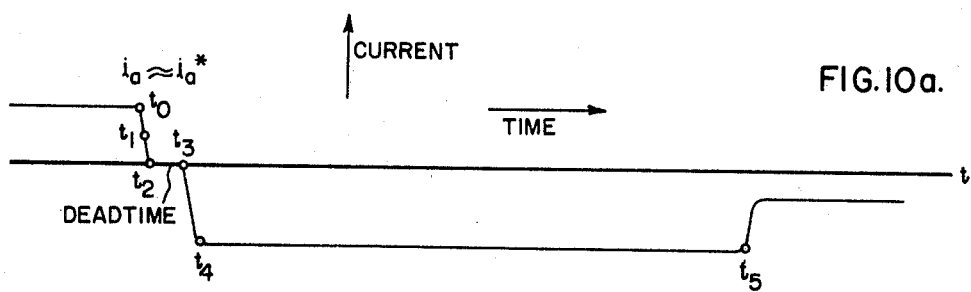
Figure 10B:
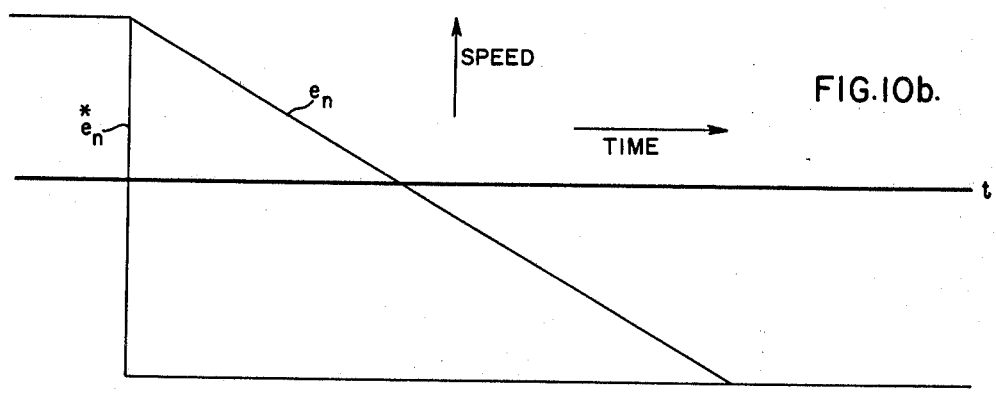

FIG. 9 is a graph similar to FIG. 2 showing how the apparatus operates when the reference signal calls for a reversal of the drive according to this invention from forward to reverse; and FIGS. 10a and 10b are graphs showing how the current and speed of the motor change during such reversal.

FIGS. 6A, 7A and 8A are included for the purpose of aiding those skilled in the art in practicing this invention and not with any intention of restricting the scope of this invention in any way.

Figure 1:
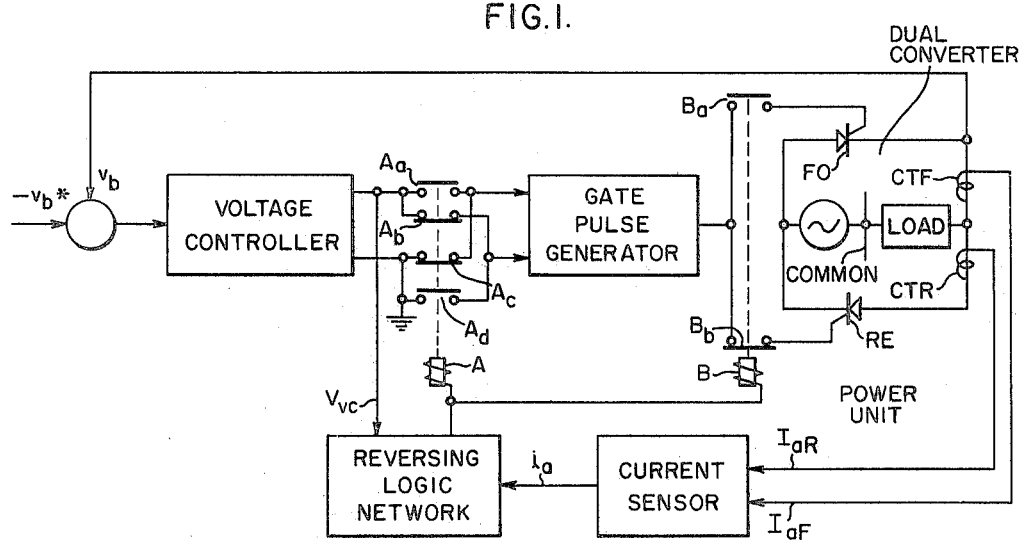
FIGURE 1 is a functional block diagram showing, in rudimentary form, an embodiment of this invention.

In accomplishing the objective of this invention the output voltage of the Voltage Controller instead of the Current Reference signal is used to control the Gate Pulse Generator. Generally this output voltage is processed together with the current feedback signal in a Reversing Logic Network to determine which one of the converters should be gated. FIGURE 1 is a functional diagram illustrating this principle. In FIG. 1 and the related figures symbols, $v_b^*$, $v_b$ etc. are presented for the parameters, voltage, current etc. These symbols are assumed to represent positive values; where there are negative parameters a minus sign appears before the symbol.

The apparatus shown in FIG. 1 includes a POWER

UNIT which includes a Load supplied from a Dual Converter including forward valve means FO and reverse valve means RE. The supply of power to the Load is regulated by feedback loops including a voltage loop having a Voltage Controller. The Voltage Controller is supplied with a reference signal $v_b^*$, which may be derived from a current loop (not shown in FIG. 1) or may be directly impressed, and with a feedback signal $v_b$. The signals are matched and their resultant commands the response of the voltage.

The Dual Converter is gated through a Gate Pulse Generator. This Generator is connected selectively to gate valve means FO or RE depending on the setting of a relay B and is controlled selectively by the output $V_o$ of the Voltage Controller, as determined by the setting of relay A. The Voltage Controller sets the conduction of the selected valve means FO or RE to control the power supplied to the load.

The relays A and B are controlled by a Reversing Logic Network which processes the output $V_o$ and the output $i_a$ from a Current Sensor. The signal $i_a$ is derived by comparing the forward current signal $I_{af}$ derived from a forward current transformer CTF and the reverse current signal $I_{ar}$ derived from reverse current transformers CTR. Depending on the result obtained by processing the signals $V_o$ and $i_a$, the relays A and B are either picked up or dropped out. The contacts $B_b$ or $B_a$ of relay B feed the gate pulses to the proper valve means FO or RE and contacts $A_a$ and $A_d$ or $A_b$ and $A_c$ of relay A provides for the necessary change in feedback polarity.

As shown in FIG. 1 this invention is applicable to operation in which during the transition from one direction of rotation of the load to the other the dead band between the conductions of the forward and the reverse sets of valve means is relatively small. In this case the signal $V_o$ derivable from the Voltage Controller is not alone adequate to determine the setting of the Gate Pulse Generator. It is necessary to combine this Voltage Controller signal with a current signal $i_a$ which indicates in what direction the current is flowing, and signals the necessity for proper setting of the Gate Pulse Generator when the current corresponding to the operation which is to be changed reaches zero. It has been realized, in connection with this invention that if the dead band is made wide enough so that the control ranges of the two valve means are reliably completely separated, the polarity of the output voltage ($V_o$) of the voltage controller indicates which one of the two valve means is to be selected for gating (FIG. 2).

Simplification is achieved in accordance with this invention by limiting the range of operation of the Dual Converter so that it does not saturate. This can be accomplished by limiting the input reference signal $v_b^*$ to the Voltage Controller. The output voltage $V_o$ of the Voltage Controller, with the reference signal so limited, is the only required signal to determine the setting of the Gate Pulse Generator. It is necessary to combine this Voltage Controller signal with a current signal with a current signal $i_a$ which indicates in what direction the current is flowing, and signals the necessity for proper setting of the Gate Pulse Generator when the current corresponding to the operation which is to be changed reaches zero. It has been realized, in connection with this invention that if the dead band is made wide enough so that the control ranges of the two valve means are reliably completely separated, the polarity of the output voltage ($V_o$) of the voltage controller indicates which one of the two valve means is to be selected for gating (FIG. 2).

This operation is illustrated in FIG. 2 in which the ratio, $E_d/E_{do}$ is plotted vertically and $V_o$ horizontally. $E_d$ is the actual voltage output of the Dual Converter at any setting, $E_{do}$ is the maximum voltage output of the Dual Converter assuming full conduction of the selected valve means but open circuit load conditions, and $V_c$ is the rectified output of the Voltage Controller.

If forward current flows, the transfer curve CFO of the forward valve means FO applies, and conversely, the one CRE for the reverse valve means RE applies if reverse current flows. If the pulse retardation limit is removed and the voltage range limited to less than plus or minus $E_{do}$, the control voltage $V_o$ of the Voltage Controller is limited to positive values, for forward Dual Converter current, and similarly, it is limited to negative values for reverse Dual Converter current. The control voltage $V_o$ derived from the Voltage Controller is then the only signal which has to be checked to determine which one of the valve means has to be gated on. The Reversing Logic Network then simplifies to a Voltage Sensor. As the polarity and magnitude of load current does not have to be determined, the double set of current transformers CTF and CTR for deriving current magnitudes can be replaced by a single transformer UCT, VCT, WCT (FIG. 5B) on each bus.

In the apparatus shown in FIGS. 3–8 the control of the Dual Converter is such that the setting of the Gate Pulse Generator is determined only by the voltage derived from the Voltage Controller. The necessary relationship in this case is illustrated in FIG. 2. The control voltage $V_o$ determines the angles in the half periods of the supply during which the valve means for either direction are fired is so limited that $E_d/E_{do}$ during inverter operation is limited to .9. This .9 is essentially fictitious corresponding to open circuit load conditions. The effect of this is to displace the curves CFO and CRE for forward and reverse operation so that forward operation takes place only so long as $V_o$ is positive and reverse operation can take place only so long as $V_o$ is negative. Thus the polarity of $V_o$ is the only criterion for the setting of the Gate Pulse Generator.

The apparatus shown in FIGS. 3 through 8 is a controlled and regulated drive including a Power Unit and a plurality of regulating loops: a speed loop, a current loop and a voltage loop. This apparatus also includes a Gate Pulse Generator which controls the operation of the motor and which is controlled by the controlling and regulating loops. A common Gate Pulse Generator controls the firing of both the forward and the reverse valve means of the Dual Converter. The Power Unit includes the drive motor MO, which may be a direct-current motor provided with a commutator CO, and a Dual Converter. In FIG. 3 (also FIG. 1) the valve complexes of the Dual Converter are symbolized by only two valves, one labeled FO for forward and one labeled RE for reverse. The selection of the forward or reverse valve means is symbolized by contacts RRa and RRb of a relay RR which is actually included in the Gate Pulse Generator.

The speed loop includes a Speed Controller. A feedback signal $e_n$ is impressed on the Speed Controller. This signal is derived from a tachometer TA driven by the motor MO and is proportional to the speed of the motor MO.

The Speed Controller is also supplied with a reference voltage $e_n^*$. The voltage $e_n^*$ and $e_n$ are matched against each other and determine the output $i_a^*$ of the Speed Controller which is the current reference signal. For forward operation of the motor MO the speed reference signal is of negative polarity and is presented as $-e_n^*$ in FIG. 3 and the current reference signal $i_a^*$ is electrically positive and so present. The current loop includes a Current Controller. This Current Controller receives the reference signal $i_a^*$ from the Speed Controller and a feedback signal $i_a$ dependent on the current conducted by the motor MO. The current loop includes a Current Sensor. A current signal derived through current transformers UCT, VCT and WCT coupled to the buses U, V and W, typically of a commercial supply from which the motor MO is energized through the Dual Converter, is supplied to the Current Sensor. In FIG. 3 the current transformers are symbolized by a single transformer on the connection to the commutator CO. The feedback signal $i_a$ is derived from the Current Sensor.

The signal $i_a{}^*$ is matched against the signal $i_a$ in the input of the Current Controller and a voltage reference signal $v_b{}^*$ is derived from the output. For forward operation of the motor MO the voltage-reference signal is electrically negative and is presented $-v_b{}^*$.

The voltage loop includes a Voltage Controller. This Voltage Controller receives the reference signal $v_b{}^*$ from the Current Controller. The voltage loop also includes a Voltage Sensor which derives a voltage signal from the motor terminal and impresses a signal $v_b$ in the input of the Voltage Controller. The signal $v_b$ is matched against the reference signal $v_b{}^*$.

The Gate Pulse Generator receives a signal from the Voltage Controller which sets the Gate Pulse Generator to control the angle of firing of the valve means selected for conduction and thus the current conducted through, or the power supplied to, the motor. In addition, the Gate Pulse Generator selects the valve means of the Dual Converter which is to be connected in energizing relationship with the motor MO.

So that the Gate Pulse Generator may be set for the proper selection of the valve means the apparatus includes a Reversing Sensor. This Reversing Sensor receives a signal from the Voltage Controller dependent on the error signal impressed in its input, that is, on the difference between $v_b$ and $v_b{}^*$. Depending on the polarity and magnitude of this signal, the Reversing Sensor transmits a signal to the Gate Pulse Generator which sets the latter to select the appropriate valve means. As shown in FIGS. 3 through 8, this is effected by a relay RR with the cooperation of relays 1CR and 1CRA which are energized or de-energized depending on the valve means to be selected for conduction. For forward operation of the motor MO the relay 1CR in the Voltage Controller, the relay RR in the Gate Pulse Generator and the relay 1CRA in the Current Sensor are actuated and for reverse operation they are unactuated.

In the practice of this invention the selection of the valve means FO or RE, to be connected in energizing relationship with the motor MO is then effected in dependence upon signals derived from the Voltage Controller. The regulation is effective by the Speed Controller, by the Current Controller and by the Voltage Controller. The Speed Controller being the outermost loop must have the lowest time response. The Current Controller must have an intermediate time response and the Voltage loop the highest time response. In the electric-drive art the response of a loop is specified in terms of the frequency at which this loop has a gain of one where the frequency is expressed or presented as a function of the gain for the loop. In the typical practice of this invention the Speed Controller has a gain of one for a frequency of about 15 radians per second, the current loop a gain of one for a frequency of about 200 radians per second and the voltage loop a gain of one for a frequency of about 800 radians per second. But the feedback into the current loop includes not only the current-error signal but also the first time derivative of the error signal so that the response time of the current loop is decreased. The speed loop thus has a time constant, or a time delay between an input signal and response, of between 50 and 60 times the corresponding time constant of the voltage loop, while the current loop has a time constant of about 20 times the voltage loop.

Figure 4:
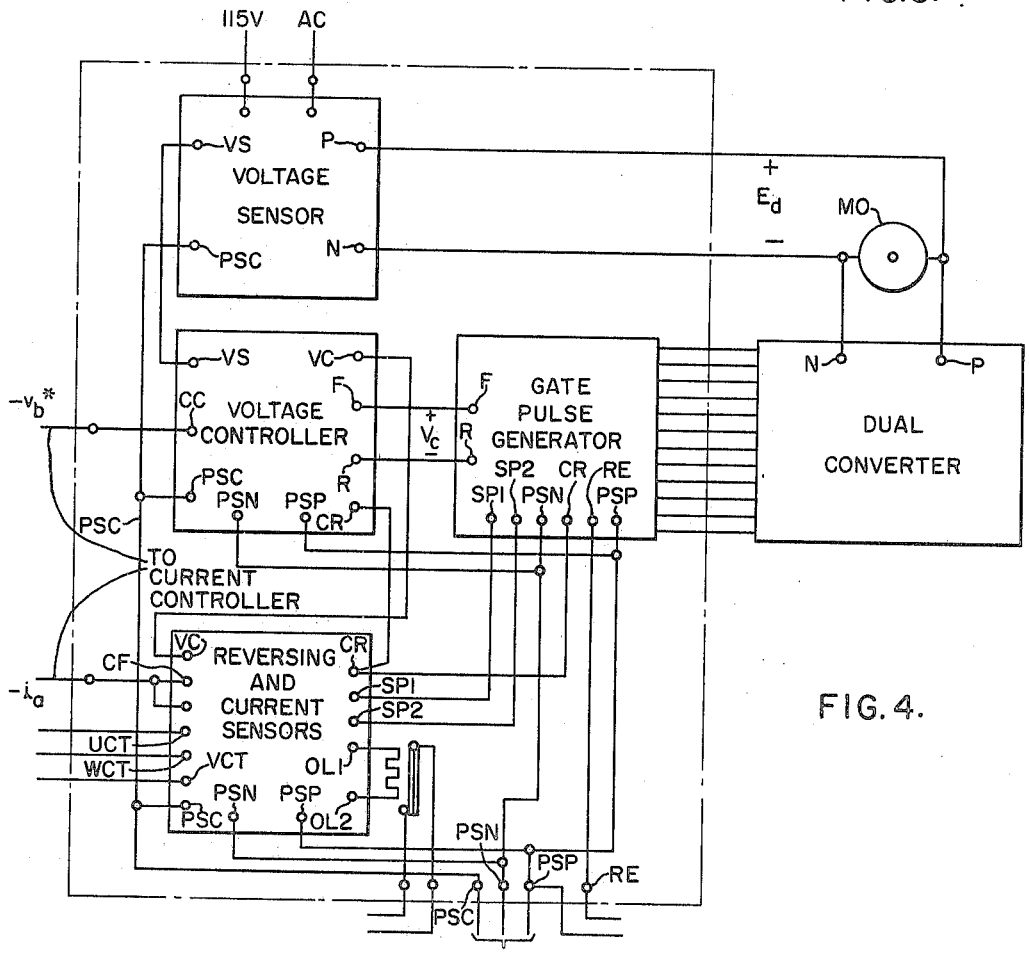
FIG. 4 is another block diagram, included for the purpose of aiding those skilled in the art in practicing this invention, and showing the principal components which cooperate in the practice of this invention as disclosed in FIG. 3 and their principal interconnections.

In the practice of this invention the Speed Controller and the Current Controller may be conventional. The Gate Pulse Generator, the Voltage Sensor, Voltage Controller, Reversing Sensor and Current Sensor are adapted to the practice of this invention. FIG. 4 shows the principal components of FIG. 1 which are involved in the practice of this invention and their terminal connections.

The Gate Pulse Generator and the Dual Converter and their interconnections are shown in FIGS. 5A and 5B. The Gate Pulse Generator and its relationship to the Dual Converter is shown in this application in block form. The details of this apparatus is disclosed in an application, Ser. No. 518,325, filed Jan. 3, 1966, now Patent No. 3,440,447, to Hall and Stringer for Gate Pulse Generator.

The Dual Converter has forward valve means which includes the thyristors F–1TH, F–2TH, F–3TH, F–4TH, F–5TH, F–6TH and reverse valve means which includes R–1TH through R–6TH. For brevity these thyristors will be referred to herein as F–TH and R–TH. Each thyristor F–1TH through F–6TH and R–1TH through R–6TH includes a firing transformer F–T1 through F–T6 and R–T1 through R–T6. The secondary F–S1 through F–S6 and R–S1 through R–S6 of each transformer impresses a firing voltage between the gating electrode and the base of the corresponding thyristor through a pulse shaping network including a capacitor 20C and a resistor 20R. For protection against transients a capacitor 30C and a resistor 30R are connected across each thyristor F–1TH through F–6TH and R–1TH through R–6TH.

The thyristors F–TH and R–TH are connected to be supplied from the buses U, V and W of a three-phase commercial supply and connect the supply in selective energizing relationship with the armature A of the motor MO. A forward thyristor F–TH and a reverse thyristor R–TH are inversely connected between each terminal of the armature A and a bus of the supply so that at all times current through the armature is conducted through at least two thyristors. Thus the thyristors F–4TH and R–1TH are connected between the bus U and one terminal of the armature AR through the inductor 4L and thyristors F–1TH and R–4TH between bus U and the other terminal of AR through inductor 1L. The other thyristors are correspondingly connected. The inductors 1L through 6L serve for short circuit and fault protection. These reactors 1L through 6L suppress feed through of abrupt voltage from one commutating group of thyristors, F–TH or R–TH to the other, R–TH or F–TH during commutation. It is advantageous that the conductors 1L through 6L be toroidal cores of suitable ferrite material encircling the anode conductors from the thyristors. By creating a path of high permeability around the anode leads with high-frequency magnetic material, an effective reactance can be introduced at a great saving in cost, size and dissipation. This ferrite reactor may saturate during the conduction cycle. But, it has been recognized that this is insignificant as long as no saturation occurs at the time of application of abrupt voltages. A number of toroids encircle each conductor depending on the extent of the suppression required. Typically the toroids may be Ferrox Cube Corp. of America-3C5.

For transient protection a capacitor 40C and a resistor 40R are connected between each pair of buses U and V, and W, and U and W. Surge protectors SP are also connected between the pairs of buses U, V and W.

The details of the Gate Pulse Generator are disclosed in the above mentioned Hall-Stringer application, S.N. 518,325, now Patent No. 3,440,447. For the purposes of this application a brief description will suffice.

The Gate Pulse Generator includes a plurality of firing blocks 1 through 6, each block being connected to fire a pair of forward thyristors F–TH and a corresponding pair of reverse thyristors R–TH. The firing blocks 1 through 6 deliver firing pulses through contact RRa of relay RR to transformers R–T1 and R–T6, R–T2 and R–T1, R–T3 and R–T2, R–T4 and R–T3, R–T5 and R–T4, and R–T6 and R–T5 respectively, at predetermined instants in the periods of the supply to fire the corresponding thyristors. Blocks 1 through 6 are adapted to deliver pulses through contact RRb to transformers F–T1 through F–T6 in pairs having the same numbers after the T's as above. The firing pulses are triggered by the conduction of triggering transistors STR1, STR2, STR3, STR4, STR5, STR6 in each of the firing blocks 1 through 6 respectively. Each of the switching transistors is set to be triggered at an instant in the half periods of the supply determined by potential derived from a control block. The firing pulses are triggered between a common conductor LC which is electrically positive during the pulsing and a plurality of separate firing conductors LF1 through LF6 which are electrically negative during the firing.

The conduction of the switching transistors STR1 through STR6 is controlled by a Control Block which receives signals from the Voltage Controller and from the Reversing Sensor to effect the control. This Block includes a pair of terminals F and R. The terminal F is connected to common LC and the terminal R is connected to control the conduction of an emitter Follower. A potential is impressed on the Emitter Follower through the terminals F and R which is dependent on the direct current derived between the terminals F and R of the Voltage Controller and a direct-current potential of corresponding variable magnitude is derived from the Emitter Follower. This potential appears between an output conductor LO1 from the emitter follower and the common conductor LC. The conductor LO1 is connected to the center tap of the secondary of a six-phase transformer TPC which derives its power in synchronization with power of the buses U, V and W. The terminals of this six-phase transformer TPC are connected respectively to the bases of the switching transistors STR1 through STR6 through a resistor 60R and a diode 60D. The instants in the half periods of the supply U, V and W at which the respective switching transistors STR1 through STR6 are rendered conducting is determined by the composite DC potential derived from LO1 and the alternating potential derived from TPC, and the switching transistors STR1 through STR6 are switched at predetermined instants in the potentials of the supply U, V, W in dependence upon the magnitude of the DC potential derived from LO1. The firing pulses thus appear between LFL1 through LF6 and LC at these instants and the thyristors F–TH and R–TH are fired at corresponding instants.

For the purpose of determining which of the thyristors F–TH or R–TH are to be fired the relay RR is provided. This relay is controlled from the Reversing Sensor and is set in accordance with the demands of the loading. As shown in FIGS. 5A and 5B the relay RR is deenergized and in this position it is set to fire the reverse thyristors R–TH. Typically a firing pulse which appears between LC and LF1 is transmitted to fire R–1TH in the following circuit: LC, RRa, conductor RC, conductor L1, primary R–P1, conductor L2, diode 70D, negative conductor LF1. This pulse fires R–1TH. Simultaneously another pulse is transmitted to fire R–6TH in the following circuit: LC, RRA, RC, conductor L3, primary R–S6, conductor L4, diode 71D to LF1. Current determined by the setting of the magnitude of the potential between F and R, which determines the potential between LO1 and LC, is transmitted in the following circuit: U, 4L, R–1TH, AR, R–6TH, 3L, V.

The conduction of the thyristors R–TH and F–TH overlap. Each thyristor conducts approximately during 120° intervals but the thyristors are fired at successive 60° intervals. Approximately ⅙ of a period after a pulse is produced by Firing Block 1, Firing Block 2 produces a pulse. This pulse fires R–1TH and R–2TH. R–2TH is fired in the following circuit: LC, RRa, RC, conductor L5, R–P2, conductor L6, diode 72D, LF2. Thyristor R–1TH is refired in the following circuit: LC, RRa, RC, L1, R–P1, L2, diode 73D, LF2. At this point the supply potential between U and V has reached the point at which R–6TH becomes non-conducting and R–2H becomes conducting in the following circuit which is supplied from U and W: U, 4L, R–1TH, AR, R–2TH, 5L, W. As pulses are supplied by the firing blocks 1 through 6 in synchronism with the changing in the polarity among pairs of the conductors U, V and W, succeeding thyristors of the reverse valve means R–1TH through R–6TH are rendered conducting and current is supplied in accordance with the magnitude of the direct current potential impressed between terminals F and R.

The Gate Pulse Generator may be set to fire the forward thyristors F–TH from the Reversing Sensor. For this purpose the relay RR is actuated opening RRa and closing RRb. In this case the pulse from Firing Block 1 fires F–1TH and F–6TH. F–1TH is fired in the following circuit: LC, RRb, conductor FC, conductor L7, F–P1, conductor L8, diode 74D, LF1. F–6TH is fired in the following circuit: LC, RRb, FC, conductor L9, F–P6, conductor L10, diode 75D, LF1. With F–1TH and F–6TH conducting current flows through the motor MO in the following circuit: U, 1L, F–1TH, MO, F–6TH, 6L, V. ⅙ of a cycle later Firing Block 2 delivers a pulse which fires thyristors F–1TH and F–2TH. F–1TH is now fired in the following circuit: LC, RRb, FC, L7, F–P1, L8, diode 76D, LF2. F–2TH is fired in the following circuit: LC, RRb, FC, L9, F–P2, L10, diode 77D, LF2. With F–1TH and F–2TH conducting current flows in the following circuit: U, 1L, F–1TH, MO, F–2TH, 2L, W. As the Firing Blocks 1 through 6 produce successive pulses as the potentials between pairs of the conductors U, V and W cycle, the other thyristors of the forward valve means F–TH are fired.

When the reverse or forward valve means is enabled the thyristors R–1TH to R–6TH or F–1TH through F–6TH are rendered conducting in the order of their numbers. For example considering forward current it may be assumed that initially F–1TH and F–6TH are rendered conducting. Next, F–2TH is rendered conducting and the conduction of F–6TH decays; F–1TH and F–2TH now conduct. Next, F–3TH is rendered conducting and the conduction of F–1TH decays and now F–2TH and F–3TH continue to conduct. Next, F–4TH and F–3TH are rendered conducting and the conduction of F–2TH decays. Next, F–4TH and F–5TH are rendered conducting and the conduction of F–3TH decays. Next, F–5TH and F–6TH are rendered conducting and the conduction of F–4TH decays. Next, F–6TH and F–1TH are rendered conducting and the conduction of F–5TH decays.

The Voltage Sensor serves to isolate the Voltage Controller from the motor MO and also to supply an attenuated signal $v_s$ depending on the change in the signal voltage derived from the motor MO to the Voltage Controller. This Voltage Sensor includes an inverter I and a magnetic amplifier MA. Typically the inverter I may be dimensioned to deliver a substantially square-wave 10 kilocycle signal to the magnetic amplifier. The magnetic amplifier MA rectifies this signal and selects the polarity corresponding to the change in the voltage output of the motor MO.

The inverter I includes the transistors 1TR and 2TR, and the transformer 1T. The collectors and emitters of the transistors 1TR and 2TR are connected in push-pull to the primary 1TP of the transformer 1T through the resistors 4R, 5R, and 6R; 6R being connected to the common junction of the emitters. A direct current potential is impressed across the resistors 4R and 5R from a supply DC. The secondary 1TS1 of transformer 1T supplies a feedback potential to the bases of the transistors 1TR and 2TR in phase relationship such as to produce the oscillation. The transformer 1T has a core 3X through which it is coupled to the center-tapped secondary 1TS2 of transformer TT.

The magnetic amplifier MA includes input winding W3, balancing windings W1 and W2, feedback winding W4 and output windings WO1, WO2, WO3, WO4. The magnetic amplifier MA has saturable cores 1X and 2X. The windings W1 and W2 are coupled respectively to the cores 1X and 2X and the winding W3 is coupled to both cores. The windings WO1, WO2 and WO3 and WO4 are supplied in balanced relationship from the secondary 1TS2, and are connected to the output terminals $v_s$ and PSC of the Voltage Sensor through diodes 1D, 2D, 3D and 4D. For balancing purposes resistors 1R and 2R are connected between the terminals VS and PSC. A filter including a resistor 10R and a capacitor 2C is connected across the terminals of the windings WO1 through WO4.

The potential across the motor MO is impressed between the terminals F and N of W3 and determines the saturation of the cores 1X and 2X. For balancing purposes windings W1 and W2 are connected in a circuit including the resistors 7R and 8R and the variable resistor 1P. The supply DC1 is connected between the junction of the resistors 7R and 8R, which are of equal magnitude, and the adjustable arm of the variable resistor 1P through a second variable resistor 2P. The resistors 1P and 2P set the direct current supplied to the windings W1 and W2 and thus set the Voltage Sensor to be balanced for a selected armature potential. The variable resistors 1P and 2P may be mounted on a remote panel to be operated by the operator.

The magnetic amplifier includes a feedback network which is supplied from a winding W4 through a variable resistor 3P which may also be mounted on the remote panel and which sets the magnitude of the feedback. The magnetic amplifier MA may be balanced for any voltage across the terminals of the motor MO so that there is no potential between VS and PSC. Any change in the voltage of the motor MO produces a signal VS between the terminals VS and PSC. The terminal PSC is a common terminal between positive and negative supply conductors PSP and PSN and may be grounded. Common conductor LC floats electrically relative to PSC. The polarity of $v_b$, the potential between VS and PSC depends on the polarity of the change in the voltage across the armature AR.

The Voltage Controller includes a high-gain or operational amplifier A1. This amplifier has input bases B1 and B2 and an output terminal BO. The amplifier A1 is supplied from a supply including positive and negative conductors PSP and PSN and the intermediate common terminal PSC. The signal is impressed on input base B1. Input base B2 is connected to the common conductor PSC through a resistor 16R. A signal impressed on the base B1 produces a signal of opposite polarity on the base BO.

In the Voltage Controller the voltage $v_b$ derived from the Voltage Sensor is compared to a reference $v_b^*$ derived from the output of the Current Controller. The signal $v_b^*$ from the Current Controller is impressed on the base B1 through a voltage limiter bridge including the diodes 11D, 12D, 13D and 14D. The terminals TP and TN of this bridge are connected respectively to the conductors PSP and PSN through the resistors 11R and 15R respectively. Typically, the potentials on conductors PSP and PSN may be plus 24 volts and minus 24 volts and the conductor PSC may be at zero volts. In a typical situation the signal impressed between the terminals TO1 and TO2 of the bridge may be limited to approximately 10 volts. The terminal TO2 is connected to the base B1 through the resistors 12R and 14R. The voltage $v_b$ is impressed on the base B1 through the resistor 13R. The voltages are impressed so that the difference between them appears on the base B1 and determines the polarity and magnitude of the output derivable at BO. If the net potential derivable by comparing the signals $v_b$ and $v_b^*$, is positive a negative signal appears at BO and if it is negative, a positive signal appears at BO. There is a feedback network between BO and B1 which includes the resistor 17R and the capacitor 12C. The resistor 17R is a high resistor of the order of a megohm or two.

The output of the amplifier A1 appears between the terminals BO and PSC and is impressed on the output terminals F and R through a rectifier bridge including the diodes 18D, 19D, 20D and 21D and through a resistor 18R. This output is always of the same polarity regardless of the polarity of the potential between BO and PSC. The terminal F is always electrically positive and the terminal R is electrically negative. The terminal F is connected to terminal F of the Gate Pulse Generator and the terminal R is connected to the terminal R of the Gate Pulse Generator (FIG. 4) and thus a negative potential is impressed on the Emitter Follower (FIG. 5A) which in turn causes a negative potential to be impressed on LO1 and this determines the instants in the half periods of the supply when the thyristors F–TH or R–TH are fired.

The Voltage Controller includes a relay 1CR having back contact 1CRa and front contact 1CRb. The actuation of 1CR is determined from the Reversing Sensor (FIG. 4). 1CR is actuated when relay RR is actuated and forward current is flowing through the motor MO. With the relay 1CR actuated, 1CRb is closed and 1CRa is open and there is a direct feedback connection through 16D for any signal of negative polarity on BO. Thus the tendency of a signal of negative polarity to be produced on BO is suppressed. Correspondingly, when reverse current flows through the motor MO the relay 1CR is unactuated and 1CRa is closed and 1CRb is open, and in this case there is a direct feedback connection through diode 15D which suppresses any positive signal on BO. Thus when the motor is rotating in the forward direction only positive signals can appear on BO and the amplifier A1 is then responsive only to negative potentials on the base B1; and when reverse current is flowing through the motor only negative potential can appear on BO; that is, the amplifier A1 is responsive only to positive potential impressed on the base B1. The signal which amplifier A1 transmits to the Gate Pulse Generator is always of the same polarity since it is this polarity which determines the angle of firing of the thyristors R–TH and F–TH. A signal for operating the Reversing Sensor $v_c$ is derived from the terminal BO. The polarity of this signal depends on the polarity of the signal at BO.

The Reversing Sensor includes the transistors 3TR, 4TR and 5TR. The collector and emitter of 4TR are connected between the positive conductor PSP and the common conductor PSC through the resistor 33R. The base of 4TR is supplied with a biasing potential from a voltage divider network connected between PSP and PSN and including resistor 32R, diodes 23D and 22D, and resistor 21R. Normally current flows in this network. Resistor 32R is of substantially higher magnitude than resistor 31R so that there is a negative blocking bias with respect to PSC on the base. The collector and emitter of transistor 5TR are connected between PSP, the positive conductor, and PSC, the common conductor, through a resistor 37R. The base of 5TR is connected to PSP through the resistor 33R, 34R and 35R. With 4TR not conducting, there is a positive potential on the base of 5TR and it is fully conducting. The collector and emitter of the transistor 3TR is connected between the positive conductor PSP and the common conductor PSC through the coil of relay 1CRA. In addition this transistor is connected to PSP through the relays RR and 1CR (FIG. 4). The base of 3TR is connected to the collector of 5TR through the diode 24D. With 5TR fully conducting the potential of the base of 3TR is substantially at common PSC and 3TR is non-conducting.

Accordingly with a negative signal or no signal on VC, 3TR is conducting and 1CRA and 1CR and RR are deenergized. This is the situation when the motor MO is operating in the reverse direction. When the motor is to operate in the positive direction VC becomes positive reducing the current flowing through the resistor 31R and causing the transistor 5TR to become non-conducting. Under such circumstances the base of 3TR is connected to the positive conductor PSP through the resistor 37R and 3TR and conducts fully, actuating relays 1CRA, 1CR and RR. The forward valve means F–TH is then energized by the actuation of relay RR in the Gate Pulse Generator.

The Current Sensor has a three-phase rectifier bridge including the diodes 109D, 110D, 111D, 112D, 113D and 114D. This rectifier is supplied from the current transformers UCT, VCT, and WCT and produces a direct-current potential between conductors L11 and terminal OL1 which is dependent on the magnitude of the current conducted through the motor MO. The terminal OL1 and the conductor L11 are connected across low resistors 40R and 49R through a heater HE for a thermal element, that detects overcurrent, and terminal OL2. A positive potential dependent on the current through motor MO is derived from these resistors 40R and 49R.

When the Gate Pulse Generator is set to produce reverse current and relay 1CRA is unactuated the positive terminal of 40R is connected through the back contact 1CRA$a$ to the terminal CF. In this case, a positive signal dependent on the current conducted by the motor MO is transmitted through CF as the feedback signal CF to the Current Controller. When the forward current is conducted by the motor MO, the relay 1CRA is actuated and a negative potential is impressed on CF from the negative terminal of resistor 49R through front contact 1CRA$b$ which is now closed.

For the eventuality that excessive current is being transmitted through the motor MO a gate pulse Suppression signal is transmitted to the Gate Pulse Generator and it suppresses the pulse signals to fire the thyristors F–TH and R–TH so that the current flow through the motor MO is interrupted. This suppression signal is impressed between terminals SP1 and SP2 of the Current Sensor which is connected to suppression terminals SP1 and SP2 of the Gate Pulse Generator. Through these terminals SP1 and SP2 the suppression pulse is impressed on the primary SP of the suppression transformer ST. The suppression signal is derived by firing a thyristor 1TH. For this purpose the thyristor 1TH is connected between the positive and negative terminals of the potential supplied by the bridge 109D through 114D through a resistor 41R and the primary SP of the suppression transformer ST. The gate of the thyristor 1TH is connected to the negative conductor L11 through a resistor 41R and is supplied with a potential from a voltage divider including resistors 44R, 41P and 43R. The resistor 41P is variable and its arm is connected to the gate through the diodes 26D, 27D and 28D. The resistor 41P is adjusted to determine the overcurrent setting through the motor MO at which the thyristor 1TH fires. When the thyristor fires it produces a pulse between the terminals SP1 and SP2 and through the suppression transformers ST suppressing the conduction of the thyristors R–TH and F–TH (FIG. 3A).

The terminal AS in the Current Sensor is connected by a jumper J to the terminal CF when the apparatus according to this invention is used with a Dual Converter in which the valve means that conducts the forward current is of larger rating than the valve means which conducts the reverse current. Under such circumstances the resistor 46R is connected in series with the diode 35D across the portion of the voltage divider connected to the gate of 1TH including the resistor 41T and the resistor 43R. The voltage at which the thyristor 1TH fires is then reduced when the smaller-rating forward thyristors F–TH are conducting and these thyristors are protected from being damaged by overcurrent.

The operation of the apparatus may be understood with reference to FIG. 3 which shows the polarity of the reference signals and to FIG. 9 and FIGS. 10A and B. FIG. 3 also shows in small graphs at the ends of the blocks the waveforms of the input and output signals for the blocks. FIG. 9 is similar to FIG. 2 but shows by means of arrows how the state of the apparatus changes from a point K1 to a point K5 on reversal of the reference signal from $-e_n^*$ to $e_n^*$. In FIG. 10A the current through motor MO is plotted vertically as a function of time during this transition and in FIG. 10(B), the corresponding speed reference signal is plotted as a function of time. The reference signals in FIG. 3 $-e_n^*$, and $i_a^*$ and $-v_b^*$ are such as to produce forward operation of the motor MO. The polarities of the feedback signals $+e_n$, $-i_a$ and $+v_b$ correspond to this forward operation and the motor MO has speed and draws current and voltage that in normal operation $-e_n^*$ and $+e_n + i_a^*$ and $-i_a$, and $+v_b$ and $-v_b^*$ are balanced. Under these circumstances the relays 1CR, 1CRA, and RR are actuated. The forward thyristors F–1TH through F–6TH are conducting and the apparatus may be assumed to be in a setting corresponding to a point K on the right of FIG. 2 but on the sloping portion of curve CFO. Under these circumstances the forward thyristors F–1TH through F–6TH are conducting forward and the output voltage is positive.

Now assume that an instant $t0$ (FIGS. 9, 10A and 10B) while the motor MO is operating in the forward direction, the reference signal $-e_n^*$ is reversed in polarity for the purpose of producing reverse operation of the motor MO. The reversing of the reference signal $e_n^*$ has the effect of gradually reducing the signal $i_a^*$ and changing its polarity to negative, as shown by the graph on the right of the block representing the Speed Controller. The output $-v_b^*$ is then changed to a lower absolute value $-v_b^*$ which in turn calls for reduction of the armature voltage from point K at $t0$ to a lower voltage K1 at time $t1$; $t1$ is a transient time between $t0$ and $t2$. The voltage $V_o$ is lower than the counter electromotive force of the motor MO. The reduction of the voltage from K to K1 reduces the current (reducing $i_a$) and at time $t2$ the forward current has stopped flowing through the motor MO. The voltage at this point becomes K2, the counter EMF of the motor.

Since the reference signal $-i_a^*$ at the input of the Current Controller continues to call for reversal of current, the output signal of the Current Controller $v_b^*$ continues to reduce to absolute magnitude. As $v_b^*$ is being matched against feedback signal $v_b$ which now is constant, corresponding to the counter EMF, the output voltage $V_o$ of the Voltage Controller reduces and reverses rapidly. When the voltage $V_o$ reaches zero, the Reversing Sensor of the apparatus (Relays RR) comes into operation and the Gate Pulse Generator is disconnected from the thyristors F–TH and connected to the thyristors R–TH. At the same time the relay 1CR is deenergized and then allows the Voltage Controller output voltage to reverse. Also relay 1CRA is deenergized reversing the polarity of the output signal $i_a$ of the Current Sensor when it will reappear.

The output voltage $V_o$ of the Voltage Controller now continues to swing to more negative magnitudes. At the time $t3$ the reverse thyristors R–TH are gated so as to produce reverse current. At this time the motor MO is still rotating in the forward direction and the thyristors R–TH are operating as inverters. The time from $t2$ to $t3$ is the dead time of the apparatus during which no current flows in either direction. After $t3$ the current builds up in the reverse direction until it reaches a magnitude where the current signal $i_a$ matches the reference signal $i_a^*$; this occurs at time $t4$. This current remains unchanged until at time $t5$ the speed signal $-e_n$ matches the speed reference $e_n^*$. At this point the current in the reverse direction is reduced to a magnitude just sufficient to overcome the load. In the use of this apparatus it has been found that the direction of rotation of a motor of high rating, for example 75 horsepower, may be changed without hunting or other disturbances.

While a preferred embodiment of this invention has been disclosed herein many modifications are feasible. This invention, then, is not to be restricted except insofar as is necessitated by the spirit of the prior art.

We claim as our invention:

1. Drive apparatus including a motor, a dual converter connected in energizing relationship with said motor and including forward valve means for energizing said motor to operate in the forward direction and reverse valve means for energizing said motor to operate in the reverse direction, a gate pulse generator to be connected to said dual converter to actuate selectively said forward or reverse valve means to selectively energize said motor as aforesaid, a current feedback loop including a current controller and said gate pulse generator and responsive to a first feedback signal dependent on the current conducted by said motor for regulating said motor in accordance with the current conducted by said motor at a predetermined setting, a voltage loop including a voltage controller and said gate pulse generator responsive to a second feedback signal dependent on the voltage across said motor for regulating said motor in accordance with its voltage, a reversing sensor responsive to said voltage controller for setting said gate pulse generator selectively to actuate one or the other of said valve means depending on the demands of said voltage controller, and means responsive to said reversing sensor for setting the polarity of the first feedback signal in accordance with said setting of said gate pulse generator.

2. The apparatus of claim 1 wherein the dual converter is of the asymmetric type, one of the forward valve means being of higher rating than the other of the valve means, the said apparatus also including pulse-suppression means connected to the gate pulse generator for suppressing the firing pulses of the gate pulse generator when the load current exceeds a predetermined magnitude, the said apparatus including means responsive to the reversing sensor for setting said pulse-suppression means to suppress said firing pulses for lower load currents when said gate pulse generator is set to fire the valves of said one valve means than when it is set to fire the valves of said other valve means.

3. The apparatus of claim 1 includes: a speed feedback loop and wherein, when the gain of each loop is viewed as a function of the frequency of a signal impressed on said voltage loop, the voltage loop has a frequency of about 55 times the frequency of the speed loop and about 4 times the frequency of the current loop at a gain of 1.

4. The apparatus of claim 1 includes: means for applying an input reference signal to said voltage controller indicating the desired operation of said motor, said reference signal is limited so that the dual converter does not saturate, whereby the curves expressing the ratio of the voltage to maximum voltage as a function of the output voltage for forward and reverse operation are so separated that variation of the conduction of the forward valve means over its whole available range takes place only for varying voltage from the voltage controller, between a lower magnitude of one polarity and a higher magnitude of the same polarity, and variation of the conduction of the reverse-valve means over its whole available range takes place for varying voltage, from the voltage controller, between a lower magnitude of the opposite polarity and higher magnitude of said opposite polarity.

References Cited

UNITED STATES PATENTS

| | | | |
|---|---|---|---|
| 2,778,982 | 1/1957 | Loeffler | 318—257 |
| 3,302,089 | 1/1967 | Rosa et al. | 318—300 X |
| 3,401,325 | 9/1968 | Stringer | 318—302 |

ORIS L. RADER, Primary Examiner

ROBERT J. HICKEY, Assistant Examiner

U.S. Cl. X.R.

318—308, 345